US008464222B2

(12) United States Patent
Bell et al.

(10) Patent No.: US 8,464,222 B2
(45) Date of Patent: Jun. 11, 2013

(54) METHOD, APPARATUS OR SOFTWARE FOR IDENTIFYING DEPENDENCIES BETWEEN COMPONENTS FOR A GIVEN BUILD OF A COMPONENTISED PRODUCT

(75) Inventors: David R. Bell, Southampton (GB);
Christopher S. Bygrave, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 12/356,522

(22) Filed: Jan. 20, 2009

(65) Prior Publication Data

US 2009/0187894 A1  Jul. 23, 2009

(30) Foreign Application Priority Data

Jan. 21, 2008  (EP) ..................................... 08150459

(51) Int. Cl.
*G06F 9/44* (2006.01)
(52) U.S. Cl.
USPC ........................................................ 717/126
(58) Field of Classification Search
None
See application file for complete search history.

(56) References Cited

U.S. PATENT DOCUMENTS

| | | | | |
|---|---|---|---|---|
| 5,325,533 A | * | 6/1994 | McInerney et al. | 717/107 |
| 7,210,127 B1 | * | 4/2007 | Rangachari | 717/128 |
| 7,823,148 B2 | * | 10/2010 | Deshpande et al. | 717/174 |
| 2002/0160833 A1 | * | 10/2002 | Lloyd et al. | 463/29 |
| 2004/0181790 A1 | * | 9/2004 | Herrick | 717/168 |
| 2004/0194060 A1 | * | 9/2004 | Ousterhout et al. | 717/120 |
| 2005/0071818 A1 | * | 3/2005 | Reissman et al. | 717/127 |
| 2005/0086640 A1 | * | 4/2005 | Kolehmainen et al. | 717/120 |
| 2005/0172306 A1 | * | 8/2005 | Agarwal et al. | 719/328 |
| 2006/0026591 A1 | * | 2/2006 | Backhouse et al. | 717/177 |
| 2006/0064685 A1 | * | 3/2006 | DeFolo | 717/169 |
| 2006/0080656 A1 | * | 4/2006 | Cain et al. | 717/174 |
| 2006/0130040 A1 | * | 6/2006 | Subramanian et al. | 717/168 |
| 2006/0184927 A1 | * | 8/2006 | Deblaquiere et al. | 717/168 |
| 2007/0234300 A1 | * | 10/2007 | Leake et al. | 717/124 |
| 2007/0240152 A1 | * | 10/2007 | Li et al. | 717/174 |
| 2008/0086499 A1 | * | 4/2008 | Wefers et al. | 707/102 |
| 2008/0104573 A1 | * | 5/2008 | Singla et al. | 717/120 |
| 2008/0120598 A1 | * | 5/2008 | Imeshev | 717/120 |
| 2008/0201705 A1 | * | 8/2008 | Wookey | 717/175 |
| 2009/0089755 A1 | * | 4/2009 | Johnson et al. | 717/124 |

* cited by examiner

*Primary Examiner* — Wei Zhen
*Assistant Examiner* — Adam R Banes
(74) *Attorney, Agent, or Firm* — Steven Greenberg, Esq.; Carey, Rodriguez, Greenberg & O'Keefe

(57) ABSTRACT

A method, apparatus and software is disclosed for identifying dependencies between components for a given build of a componentised product in which the results of testing of combinations of existing and new components that comprise the product are used to identify dependencies between new components.

13 Claims, 4 Drawing Sheets

201

| Component | 1 | 2 | 3 | 4 | 5 |
|---|---|---|---|---|---|
|  | 9 | 11 | 5 | 19 | 311 |
|  | 10 | 12 | 6 | 20 | 312 |
|  | 11 | 13 | 7 | 21 | 313 |
|  | 12 | 14 | 8 | 22 | 314 |
|  |  | 15 |  |  | 315 |
|  |  | 16 |  |  |  |
| Latest Version | 12 | 16 | 8 | 22 | 315 |

| Components | | Test Results |
|---|---|---|
| Existing | New | |
| 12, 15, 8, 22, 314 | None | Pass |
| 12, 8, 22, 314 | 16 | Fail |
| 12, 15, 8, 22 | 315 | Pass |
| 12, 8, 22 | 16, 315 | Pass |
|  |  |  |

Figure 3

METHOD, APPARATUS OR SOFTWARE FOR IDENTIFYING DEPENDENCIES BETWEEN COMPONENTS FOR A GIVEN BUILD OF A COMPONENTISED PRODUCT

CROSS-REFERENCE TO RELATED APPLICATIONS

This application claims priority under 35 U.S.C. 119(a) to European Patent Application Serial Number 08150459.9, FILED 21 Jan. 2008, entitled "A METHOD, APPARATUS OR SOFTWARE FOR IDENTIFYING DEPENDENCIES BETWEEN COMPONENTS FOR A GIVEN BUILD OF A COMPONENTISED PRODUCT", the entirety of which is incorporated herein by reference.

FIELD OF THE INVENTION

The present invention relates to a method, apparatus or software for identifying dependencies between components for a given build of a componentised product.

BACKGROUND OF THE INVENTION

Many products, such as software systems, are produced from separate parts or components. Commonly, the components are engineered in isolation and then combined to provide the final product. Updating the product, to produce a new product or a new version of the original product, involves creating new or updated versions of one or more of its components. Thus, the updated product may comprise a combination of original and updated components. Each component may be tested in isolation prior to being included in a final product build. However, such testing does not guarantee that he final product will work as expected and be free of faults. Faults may results from dependencies between two or more components that have been updated. Identifying whether or not a fault results from a genuine fault within a given component, or a dependency between components is a time consuming manual task.

SUMMARY OF THE INVENTION

An embodiment of the invention provides a method for identifying dependencies between components for a given build of a componentised product, the method comprising the steps of:
 a) selecting a set of components for assembly into a componentised product, the set comprising one or more existing components and one or more new components;
 b) identifying combinations of the selected set of components providing the componentised product where each combination of components comprises at least one of the new components;
 c) testing each combination of components and identifying each combination of components that passes or fails the testing;
 d) for each combination of components comprising a single first new component and identified as failing the testing, identifying any other of the combinations of the components identified as passing the testing and comprising the first new component and a second new component; and
 e) for any identified other of the combinations of the components comprising the first and second new components, identifying the first new component as being dependent on the second new component.

One or more of the combinations of the selected set of components may comprise existing versions of one or more components where new components are available. If no combination identified as passing the testing comprises the first new component and a second new component then the first new component may be marked as failing the testing. For each combination of components comprising a single first new component and identified as passing the testing, the first new component may be marked as passing the testing. If the other of the combinations of the components comprises the first new components and two or more second new components, the first new component may be identified as being dependent on each of the second new components. The components may be software components and the product may be a software system.

Another embodiment provides apparatus for identifying dependencies between components for a given build of a componentised product, the apparatus being operable to:
 select a set of components for assembly into a componentised product, the set comprising one or more existing components and one or more new components;
 identify combinations of the selected set of components providing the componentised product where each combination of components comprises at least one of the new components;
 test each combination of components and identifying each combination of components that passes or fails the testing;
 for each combination of components comprising a single first new component and identified as failing the testing, identify any other of the combinations of the components identified as passing the testing and comprising the first new component and a second new component; and
 for any identified other of the combinations of the components comprising the first and second new components, identify the first new component as being dependent on the second new component.

A further embodiment provides a group of one or more programs arranged to enable a group of one or more programmable device to perform a method for identifying dependencies between components for a given build of a componentised product, the method comprising the steps of:
 a) selecting a set of components for assembly into a componentised product, the set comprising one or more existing components and one or more new components;
 b) identifying combinations of the selected set of components providing the componentised product where each combination of components comprises at least one of the new components;
 c) testing each combination of components and identifying each combination of components that passes or fails the testing;
 d) for each combination of components comprising a single first new component and identified as failing the testing, identifying any other of the combinations of the components identified as passing the testing and comprising the first new component and a second new component; and
 e) for any identified other of the combinations of the components comprising the first and second new components, identifying the first new component as being dependent on the second new component.

Another embodiment provides a group of one or more programs arranged to enable a group of one or more programmable device to provide apparatus for identifying dependencies between components for a given build of a componentised product, the apparatus being operable to:

select a set of components for assembly into a componentised product, the set comprising one or more existing components and one or more new components;

identify combinations of the selected set of components providing the componentised product where each combination of components comprises at least one of the new components;

test each combination of components and identifying each combination of components that passes or fails the testing;

for each combination of components comprising a single first new component and identified as failing the testing, identify any other of the combinations of the components identified as passing the testing and comprising the first new component and a second new component; and for any identified other of the combinations of the components comprising the first and second new components, identify the first new component as being dependent on the second new component.

BRIEF DESCRIPTION OF THE DRAWINGS

Embodiments of the invention will now be described, by way of example only, with reference to the accompanying drawings in which:

FIG. 2 is a table illustrating versions of components of the software product in the system of FIG. 1;

FIG. 3 is a table illustrating test results produced in the software development system of FIG. 1.

DETAILED DESCRIPTION OF PREFERRED EMBODIMENTS OF THE INVENTION

Figure 1:
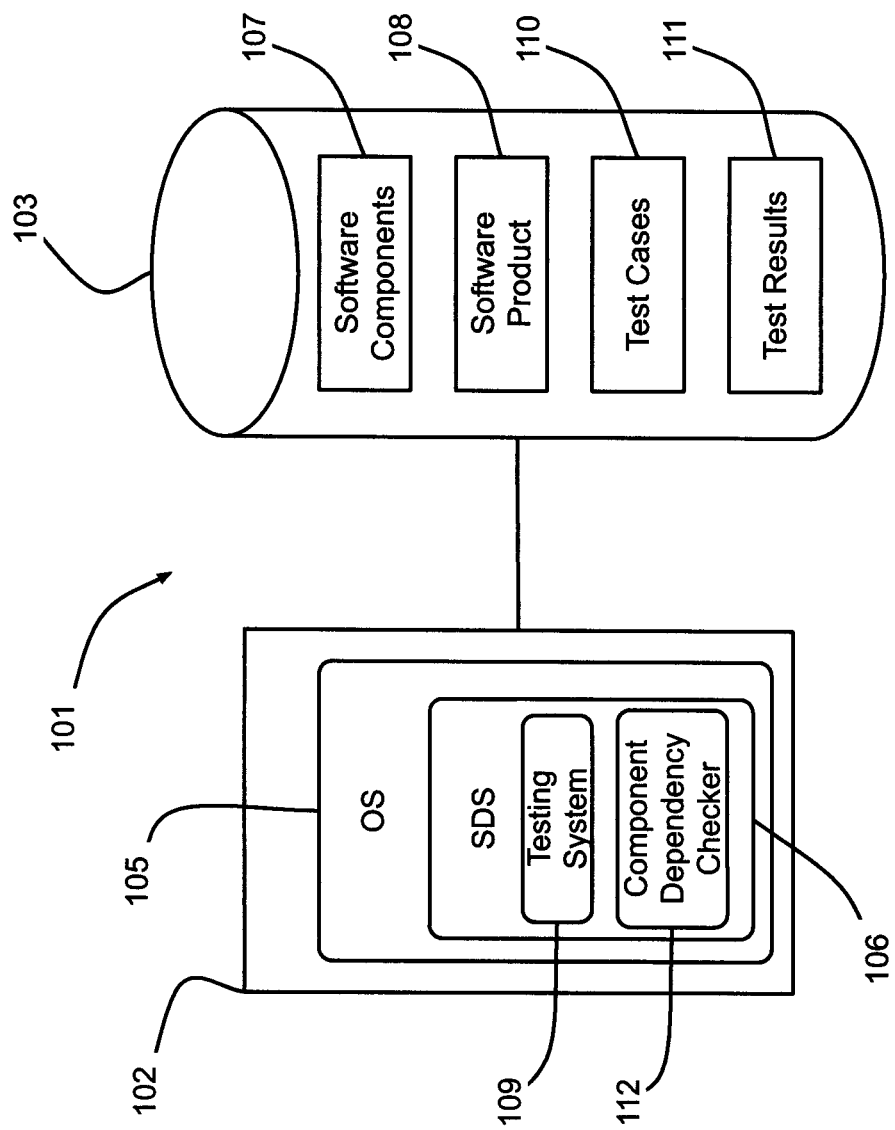
FIG. 1 is a schematic illustration of a computer system providing a software development system for developing a software product.

With reference to FIG. 1, a computer system 101 comprises a computer 102 connected to a storage device 103. The computer 102 runs an operating system (OS) 105 and is loaded with software arranged to provide a software development system (SDS) 106. The SDS 106 provides an environment in which software components 107 are created and maintained. The software components are arranged for combining into a final software product 108. The SDS 106 provides a software testing facility 109 in which test cases 110 are applied to the software product 108 to determine whether or not it functions as designed. The tests results 111 are stored on the storage device 103. The SDS further comprises a component dependency checker 112 which will be described in further detail below.

The SDS 106 further comprises a version control system (not shown) arranged to keep a track of the latest version of each of the components 107. With reference to FIG. 2, the version control system maintains a table 201 tracking versions of each of the components 107. Thus the table can be used to identify the latest version of each component required to build the software product 108. In the example data provided in the table of FIG. 2, the software product 108 is made up of five components 107. Two of the components 107, component 2 and component 5, have been updated or re-engineered so as to produce new versions 16 and 315 respectively. The new or updated components 107 are indicated in bold type in the table of FIG. 2. Thus, the latest version of the software product 108 comprises the existing versions of components 1, 3 and 4 and new versions of components 2 and 5.

FIG. 3 shows a set of test results 111 from the acceptance testing of the software product 108 using the test cases 110. The testing system 109 is arranged to apply the test cases 110 to each possible combination of new and existing components that comprises at least one new component. Thus, as shown in the test results 110 in FIG. 3, the two new components in the software product 108 result in three possible new combinations. One combination includes the existing version of components 1, 3, 4 and 5 in combination with a new version of component 2, a second combination includes the existing versions of components 1 to 4 in combination with a new version of component 5 and a third combination includes the existing version of components 1, 3 and 4 in combination with a new version of components 2 and 5. The testing system 109 records the test results for each combination. In the present example, the first combination fails the testing while the second and third combinations pass the testing.

Once the testing system 109 has compiled the test results 111, the component dependency checker 112 is arranged, under the control of the testing system 109, to analyse the results. The component dependency checker 112 is arranged to determine which of the software products that failed the testing did so as a result of one or more faulty components and which failed as a result of one or more dependencies on one or more other new components being present. The results of the processing of the component dependency checker 112 enables components, that are dependent on other components for their correct functioning, to be distinguished from faulty components. Such component dependencies may not need to be fixed but simply identified so that the correct combinations of components are included in a product build. Faulty components can thus be isolated and may be fixed or substituted for a previous non-faulty version for a given product build.

Figure 4:
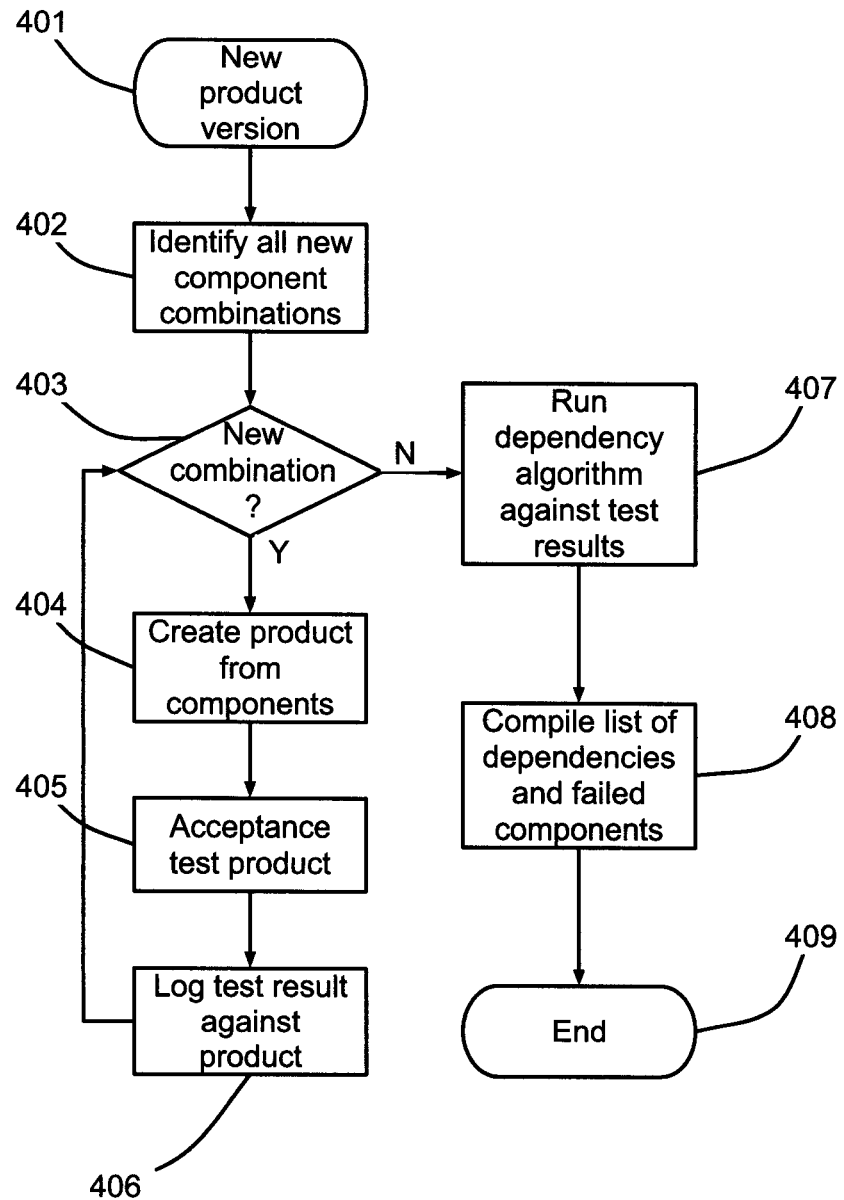
FIGS. 4 and 5 are flow charts illustrating processing performed in the software development system of FIG. 1.

The processing performed by the testing system 109 when compiling the test results 111 will now be described further with reference to the flow chart of FIG. 4. At step 401, in response to the engineering of one or more new software components for a new or updated software product, testing is initiated and processing moves to step 402. At step 402, all combinations of components that make up the new or updated software product are identified. In other words, every combination of software components is identified that comprises at least one new component. Processing then moves to step 403 where, for each new combination, the following steps 404, 405 and 406 are performed. At step 404, the selected set of components is merged into a product and processing moves to step 405. At step 405, the product is tested against the test cases 110 and processing moves to step 406. At step 406, the test results 111 are logged for the particular combination of software components as shown in FIG. 3. Processing then returns to step 403 where the next combination of software components is tested as described above. If, at step 403, no further combinations of software components require testing, processing moves to step 407. At step 407 the processing of the component dependency checker 112 is initiated as described in further detail below with reference to FIG. 5. Once the component dependency checker 112 has analysed the test results 111 processing moves to step 408. At step 408 the results of the component dependency checker 112 are organised into a list identifying any faulty components and a list identifying any dependencies between correctly functioning software components. Processing then moves to step 409 and ends.

Figure 5:
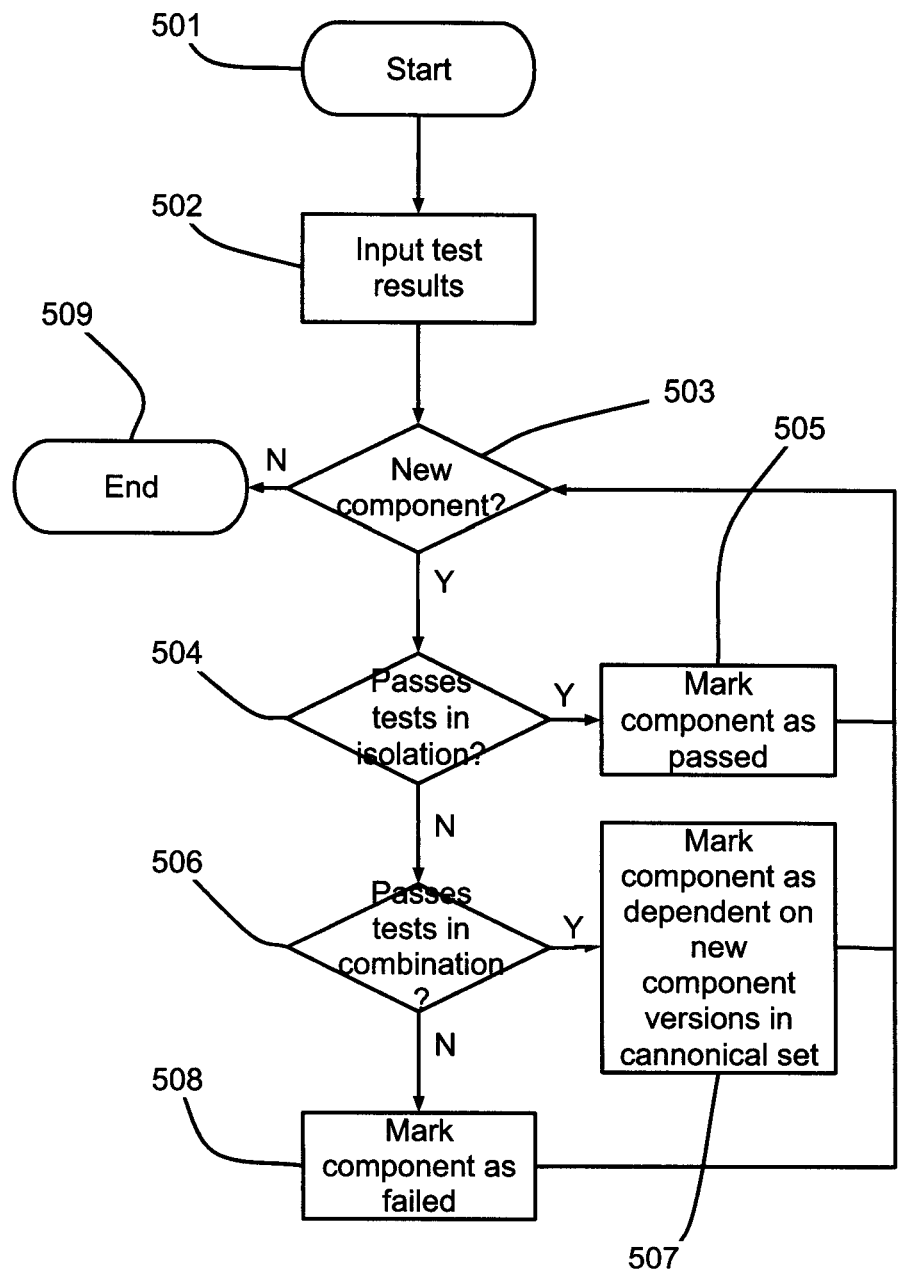

The processing performed by the component dependency checker 112 when analysing the test results 111 will now be described further with reference to the flow chart of FIG. 5. At step 501, processing is initiated by the testing system 109 and processing moves to step 502. At step 502, the test results 111 are input and processing moves to step 503. At step 503, each new software component is identified from the test results and taken in turn for processing through steps 504 to 508. For the first new software component, processing moves to step 504 where the test results 111 are inspected to determine whether the component has passed the tests 110 in isolation. In other words, whether a software product comprising a combination of software components including the given new component as the only new component has passed the testing. If so, processing moves to step 505 where the given new component is confirmed as having passed testing and processing returns to step 503 and proceeds as described above for the next new software component.

If at step 504, the given software component fails testing in isolation, processing moves to step 506. At step 506, the test results 111 are searched for each software product that has passed the tests 110 which comprises the given component in combination with one or more other new components. If one or more such passing software products are identified, processing moves to step 507. At step 507, the set of passing software products is analysed to identify each product comprising the minimal number of new components. In other words, each of the set of passing products comprises a canonical set of new components. At step 507, each minimal canonical set is identified and a set of dependencies are determined for the given software component. Each such canonical set may indicate one or more alternative dependencies. Software components may be singly or multiply dependent, that is, dependent on a set of two or more other new components. From step 507, processing returns to step 503 and proceeds as described above.

If at step 506 no other passing software products comprising the given component can be identified then processing moves to step 508 where the given component is marked as failing testing and processing returns to step 503 and proceeds as described above. If at step 503 no further new software component can be identified for processing from the test results 111 then processing moves to step 509 and ends. The results of the processing of the component dependency checker 112 is a list of components marked as either failing testing, passing testing or passing testing while being dependent one or more sets of one or more other new software components.

As will be understood by those skilled in the art, the technology described above may be applied to componentised products other than software products. A product may be built from components that are developed and engineered in isolation perhaps by separate parties.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for identifying dependencies between components for a given build of a componentised product, the method comprising the steps of:
    selecting a set of components for assembly into a componentised product, said set comprising one or more existing components and one or more new components;
    identifying combinations of said selected set of components providing said componentised product where each said combination of components comprises at least one of said new components;
    testing each of said combinations of components and identifying each combination of components that passes or fails said testing;
    selecting a first new component and determining whether a combination including the first new component as the only new component has passed the testing;
    responsive to a determination that the combination including the first new component as the only new component has failed the testing, identifying any other of said combinations of said components identified as passing said testing and comprising said first new component and a second new component; and
    for any identified other of said combinations of said components comprising said first and second new components, identifying said first new component as being dependent on said second new component.

2. The method according to claim 1 in which one or more of said combinations of said selected set of components comprise existing versions of one or more components where new components are available.

3. The method according to claim 1 in which if no combination identified as passing said testing comprises said first new component and a second new component then said first new component is marked as failing said testing.

4. The method according to claim 1 in which for each said combination of components comprising the first new component as the only new component and identified as passing said testing, said first new component is marked as passing said testing.

5. The method according to claim 1 in which if said other of said combinations of said components comprises said first new components and two or more second new components, identifying said first new component as being dependent on each said second new component.

6. The method according to claim 1 in which said components are software components and said product is a software system.

7. A hardware apparatus for identifying dependencies between components for a given build of a componentised product, the apparatus being operable to:
    select a set of components for assembly into a componentised product, said set comprising one or more existing components and one or more new components;
    identify combinations of said selected set of components providing said componentised product where each said combination of components comprises at least one of said new components;
    test each of said combination of components and identifying each combination of components that passes or fails said testing;

select a first new component and determine whether a combination including the first new component as the only new component has passed the testing;

responsive to a determination that the combination including the first new component as the only new component has failed the testing, identify any other of said combinations of said components identified as passing said testing and comprising said first new component and a second new component; and for any identified other of said combinations of said components comprising said first and second new components, identify said first new component as being dependent on said second new component.

8. The apparatus according to claim 7 in which one or more of said combinations of said selected set of components comprise existing versions of one or more components where new components are available.

9. The apparatus according to claim 7 in which if no combination identified as passing said testing comprises said first new component and a second new component then said first new component is marked as failing said testing.

10. The apparatus according to claim 7 in which for each said combination of components comprising a single first new component and identified as passing said testing, said first new component is marked as passing said testing.

11. The apparatus according to claim 7 being further operable if said other of said combinations of said components comprises said first new components and two or more second new components, to identify said first new component as being dependent on each said second new component.

12. The apparatus according to claim 7 in which said components are software components and said product is a software system.

13. A computer program product comprising a computer usable storage medium, excluding signals, embodying computer usable program code for identifying dependencies between components for a given build of a componentised product, the computer usable program code, when executed by a computer, causes the computer to perform the steps comprising:

selecting a set of components for assembly into a componentised product, said set comprising one or more existing components and one or more new components;

identifying combinations of said selected set of components providing said componentised product where each said combination of components comprises at least one of said new components;

testing each of said combination of components and identifying each combination of components that passes or fails said testing;

selecting a first new component and determining whether a combination including the first new component as the only new component has passed the testing;

responsive to a determination that the combination including the first new component as the only new component has failed the testing, identifying any other of said combinations of said components identified as passing said testing and comprising said first new component and a second new component; and identifying for any identified other of said combinations of said components comprising said first and second new components said first new component as being dependent on said second new component.

* * * * *